United States Patent [19]

Willis et al.

[11] Patent Number: 4,925,615
[45] Date of Patent: May 15, 1990

[54] METHOD OF MOLDING FIBER REINFORCED PLASTIC ARTICLES

[75] Inventors: Anthony J. Willis, Marlow; William T. H. Skelding, Kew; Bronislaw Radvan, Flackwell Heath, all of England

[73] Assignee: The Wiggins Teape Group Limited, Basingstoke, England

[21] Appl. No.: 271,345

[22] Filed: Nov. 14, 1988

Related U.S. Application Data

[63] Continuation of Ser. No. 924,760, Oct. 30, 1986, abandoned.

[30] Foreign Application Priority Data

Nov. 1, 1985 [GB] United Kingdom ................. 8527023

[51] Int. Cl.⁵ ........................................ B29C 43/18
[52] U.S. Cl. ....................................... 264/257; 264/258; 264/271.1; 264/322; 264/324; 264/325; 264/275; 264/277
[58] Field of Search ................. 264/275, 277, 41, 45.1, 264/257, 258, 112, 113, 320, 321, 322, 324, DIG 65, 271.1, 325

[56] References Cited

U.S. PATENT DOCUMENTS

| | | | |
|---|---|---|---|
| 2,715,755 | 8/1955 | Jones | 264/518 |
| 3,378,613 | 4/1968 | Hampshire | 264/46.1 |
| 3,621,092 | 11/1971 | Hofer | 264/322 |
| 3,705,071 | 12/1972 | Gras | 156/245 |
| 3,734,985 | 5/1973 | Greenberg | 264/45.3 |
| 3,785,900 | 1/1974 | Gras | 156/245 |
| 3,837,986 | 9/1974 | Gorter et al. | 425/582 |
| 3,865,661 | 2/1975 | Hata et al. | 156/79 |
| 3,891,738 | 6/1975 | Shen | 264/101 |
| 3,957,943 | 5/1976 | Ogura | 264/245 |
| 3,975,483 | 8/1976 | Rudloff | 264/137 |
| 4,178,411 | 12/1979 | Cole et al. | 428/451 |
| 4,234,652 | 11/1980 | Vanoni et al. | 428/296 |
| 4,242,404 | 12/1980 | Bondoc et al. | 428/220 |
| 4,273,981 | 6/1981 | Nopper | 264/120 |
| 4,362,778 | 12/1982 | Andersson et al. | 428/240 |
| 4,385,955 | 5/1983 | Doerfling et al. | 264/258 |
| 4,386,943 | 6/1983 | Gumbel et al. | 428/240 |
| 4,399,085 | 8/1983 | Belbin et al. | 425/325 |
| 4,426,470 | 1/1984 | Wessling et al. | 264/257 |
| 4,430,286 | 2/1984 | Franz | 264/258 |
| 4,440,819 | 4/1984 | Rosser et al. | 264/236 |
| 4,489,031 | 12/1984 | Ogihara | 264/319 |
| 4,495,238 | 1/1985 | Adiletta | 428/215 |
| 4,498,957 | 2/1985 | Sasaki et al. | 264/288 |
| 4,508,777 | 4/1985 | Yamamoto et al. | 428/224 |
| 4,543,288 | 9/1985 | Radvan et al. | 428/297 |
| 4,643,940 | 2/1987 | Shaw et al. | 428/308.4 |
| 4,666,645 | 5/1987 | Prewo et al. | 264/258 |

FOREIGN PATENT DOCUMENTS

| | | |
|---|---|---|
| 0173382 | 8/1984 | European Pat. Off. . |
| 0173382 | 3/1986 | European Pat. Off. . |
| 1504828 | 3/1964 | Fed. Rep. of Germany . |
| 2004913 | 7/1969 | Fed. Rep. of Germany . |
| 1040359 | 7/1963 | France . |
| 703023 | 10/1959 | United Kingdom . |
| 843154 | 8/1960 | United Kingdom . |
| 2096195 | 10/1963 | United Kingdom . |
| 1008833 | 8/1967 | United Kingdom . |
| 1110659 | 1/1969 | United Kingdom . |
| 1113792 | 1/1969 | United Kingdom . |
| 1129757 | 7/1971 | United Kingdom . |
| 1263812 | 8/1972 | United Kingdom . |
| 1305982 | 1/1973 | United Kingdom . |
| 1306145 | 2/1973 | United Kingdom . |
| 1329409 | 4/1973 | United Kingdom . |
| 1348896 | 5/1973 | United Kingdom . |
| 1323592 | 7/1973 | United Kingdom . |
| 1424682 | 1/1974 | United Kingdom . |
| 2065016 | 6/1981 | United Kingdom . |

OTHER PUBLICATIONS

"Fibre Foam", *Proceedings VIIth International Congress on Rheology* (1976), Turner and Cogswell.
McKelvey, *Polymer Processing*, John Wiley & Sons, Inc., N.Y., 1962, excerpt of pp. 1–5.

*Primary Examiner*—Jay H. Woo
*Assistant Examiner*—Jeremiah F. Durkin, II
*Attorney, Agent, or Firm*—Burns, Doane, Swecker & Mathis

[57] ABSTRACT

A process for moulding articles of fibre reinforced plastics material which includes pre-heating a sheet of consolidated thermoplastics material which has dispersed therein from 20% to 70% by weight of reinforcing fibres which have a high modulus of elasticity (as herein defined) and between about 7 and about 50 millimeters long to cause the sheet to expand due to relief of the stresses in the reinforcing fibres, placing the expanded sheet in a compression mould and closing the mould to form an article of predetermined shape having portions of different density.

7 Claims, 1 Drawing Sheet

METHOD OF MOLDING FIBER REINFORCED PLASTIC ARTICLES

This application is a continuation, application Ser. No. 06/924,760, filed Oct. 30, 1986 now abandoned.

This invention relates to moulded articles of fibre reinforced plastics material and to a method of moulding such articles.

Co-pending European Patent Application No. 85300034.7 (publication No. 0 148 763 A2) describes and claims a process for moulding articles of fibre reinforced plastics material which takes advantage of the stresses generated in the fibres during consolidation to produce an expanded and porous moulding.

The resulting article has a high flexural stiffness and a relatively smooth coherent surface.

BACKGROUND OF THE INVENTION

The present invention relates to a method of utilizing expanded material to produce moulded articles with portions of different density thus increasing the versatility of the article produced.

According to the present invention a process for moulding articles of fibre reinforced plastics material includes pre-heating a sheet of consolidated thermoplastics material which has dispersed therein from 20% to 70% by weight of reinforcing fibres which have a high modulus of elasticity (as herein defined) and between about 7 and about 50 millimeters long to cause the sheet to expand due to relief of the stresses in the reinforcing fibres, placing the expanded sheet in a compression mould and closing the mould to form an article of predetermined shape having portions of different density.

A high modulus of elasticity is to be taken as meaning a modulus of elasticity substantially higher than that of the sheet. Fibres falling into this category include glass, carbon and ceramic fibres such as the aramid fibres sold under the trade names KEVLAR AND NOMEX and will generally include any fibre having a modulus higher than 10,000 Mega Pascals.

The difference in density can be achieved by forming the sheet material in different thicknesses and/or the process could include shaping the forming tool mould to compress the sheet to fully compact it in the area of greater density.

The portions of greater density of the moulded article thus produced can be utilised to locate an insert, for example a bush or clip, and thus the invention also includes incorporating an insert in the portion of greater density during the moulding process.

Preferably the thermoplastic material has at least 30% by weight glass fibres and thus it may have 50% by weight glass fibres.

Preferably, the fibres are in the form of single discrete fibres. Thus, where glass fibres are used, and are received in the form of chopped strand bundles, the bundles are broken down into single fibres before the structure is formed.

The sheet may be formed of two more more layers of plastics material of different compositions which are laminated together in the moulding process. Thus three or more layers may be incorporated, the outer layers having a lower fibre content by weight than the inner layer or layers.

The thermoplastics materials may for example be of polyethylene, polypropylene, polystyrene, acrilonitrystyrenebutadiene, polyethyleneterephthalate or polyvinylchloride, both plasticised and unplasticised. Other suitable thermoplastics include polyphenylene ether or polycarbonates or polyestercarbonates or thermoplastic polymers or polyetherimides or acrylonitrile—burylacrylate—styrene polymers or amorphous nylon or polyarylene ether ketone or alloys and blends of these materials with each other or other polymeric materials.

BRIEF DESCRIPTION OF THE DRAWINGS

The invention can be performed in various ways but one embodiment will now be described by way of example and with reference to the accompanying drawings in which.

DESCRIPTION OF THE PREFERRED EMBODIMENTS

Figure 1:
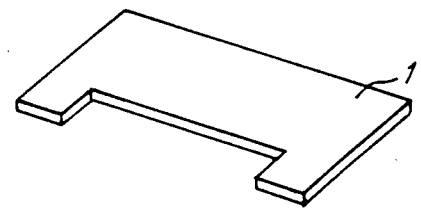
FIG. 1 is an isometric view of a shaped sheet of fibre reinforced plastics material ready for moulding.

In the process for carrying out the invention as described below a sheet of fibre reinforced plastics material 1 reinforced with glass fibres of between 7 and 50 millimeters in length is used. The precise construction of the sheet can be as set forth in European Patent Application No. 85300034.7. The preconsolidated sheet 1 is cut to a predetermined size as shown in FIG. 1 and is heated to approximately 180° to 200° Centigrade in a convenient manner, for example by use of infra-red heating in an oven of the kind described in the European Patent Application referred to above.

Figure 2:
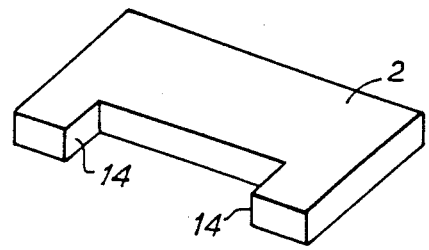
FIG. 2 shows the same sheet after heating.
Figure 3:
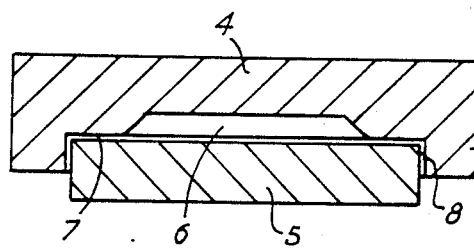
FIG. 3 is a diagrammatic side elevation of a two part mould in which the sheet shown in FIGS. 1 and 2 is to be moulded.

The heating produces a hot blank 2 which has expanded to two or three times its original thickness, as shown in FIG. 2, and is therefore of lower density.

This hot blank 2 is then placed in a compression mould 3 which comprises upper and lower portions 4 and 5. The mould is so designed that when fully closed the space between the upper portion 4 and the lower portion 5 varies. Thus, there is a wider space in the portion indicated by reference numeral 6 than at the edges indicated by reference numerals 7 and 8. This ensures that areas 7 and 8 close to fully densify the hot material in that area and others close to only partly densify material as at area 6.

The hot blank 2 is placed in the mould together with any fixing screws, hinges, bushes or other inserts and the mould is shaped so that there is greater density and strength at the areas where the inserts are placed, for example, in areas 7 and 8.

The tool is therefore designed so that when it is closed zones of differing density are produced in the blank. In the arrangement being described the fully densified areas are produced at the tool edges around the location of the inserts.

Lower density areas in the material in the area 6 are achieved.

It will be appreciated that the degree of compaction will affect the porosity of the sheet and can therefore be used as a means of determining the porosity of the moulded article.

By fully compacting the sheet in the areas where the inserts are provided they are firmly secured in place.

Figure 4:
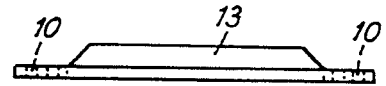
FIG. 4 is a side elevation of the sheet after moulding.

FIG. 4 shows the moulded article as it emerges from the mould with insert bushes being indicated by reference numeral 10. FIG. 5 again shows the pressed component and it will be clearly seen that the compacted areas 11 and 12 carry the inserts 10 and the less compacted area indicated by reference numeral 13 in both FIGS. 4 and 5 is thicker but is of lesser density. The larger central low density area provides stiffness while the compacted areas 11 and 12 provide secure and rigid mountings for the inserts 10.

Figure 5:
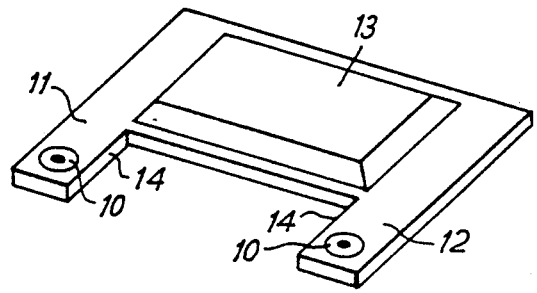
FIG. 5 is an isometric view of the moulded article as it emerges from the mould.

The shape of the mould and the sheet 2 can be arranged so that there is room to place the inserts in the mould and for the compacted material to flow around the inserts to secure them. Thus in the arrangement shown above the two arms 14 which are indicated in FIG. 2 and which form part of the heated blank extend in length during the compression of the mould to flow around the inserts 10. This will be apparent by comparison of the lengths of the arms 14 in FIG. 2, and as shown in FIG. 5 where these arms 14 have now become the compacted areas.

The fibres used in the fibre reinforced plastics material sheet can be glass fibres, carbon and ceramic fibres, resilient metallic fibres, and fibres such as the Aramid fibres sold under the trade names KEVLAR and NOMEX.

We claim:

1. A process for moulding articles of fiber reinforced plastics material which consists essentially of preheating substantially uniform density sheet consisting essentially of consolidated thermoplastic material which has dispersed therein from 20% to 70% by weight of single discrete stressed reinforcing fibres which have a high modulus of elasticity and between about 7 and about 50 millimeters long to cause the sheet to expand due to relief of the stresses in the reinforcing fibres, placing the expanded sheet and an insert in a compression mould, closing the mould to differentially compress the expanded sheet, to form portions of different densities, and cooling the thermoplastic material in the mould to form an article of predetermined shape having portions of different density with said insert being retained in a portion of greater density.

2. A process as claimed in claim 1 which includes compressing the sheet in the mould to fully compact it in at least one portion thereof.

3. A process as claimed in claim 1 in which the thermoplastics material has at least 30% by weight glass fibres.

4. A process as claimed in claim 3 in which the thermoplastics material has 50% by weight glass fibres.

5. A process as claimed in claim 1 in which the sheet is formed of two or more layers of plastics material of different compositions which are laminated together in the mounding process.

6. A process as claimed in claim 5 in which three or more layers are incorporated the outer layers having a lower fibre content by weight than the inner layer or layers.

7. A process for moulding articles of fibre reinforced plastics material which consists essentially of pre-heating a substantially uniform density sheet consisting essentially of consolidated thermoplastic material which has dispersed therein from 20% to 70% by weight of single discrete stressed reinforcing fibres which have a high modulus of elasticity and between about 7 and about 50 millimeters long to cause the sheet to expand to a thickness due to relief of the stresses in the reinforcing fibres, placing the expanded sheet together with an insert in a compression mould in which the thickness of the expanded sheet is at least as great as spacing between mold parts when the compression mold is closed, closing the mould to form an article of predetermined shape having portions of different density by differentially compressing portions of the pre-heated thermoplastic sheet, with said insert being incorporated in a portion of greater density, and cooling the differentially compressed thermoplastic sheet in the mold.

* * * * *